UNITED STATES PATENT OFFICE.

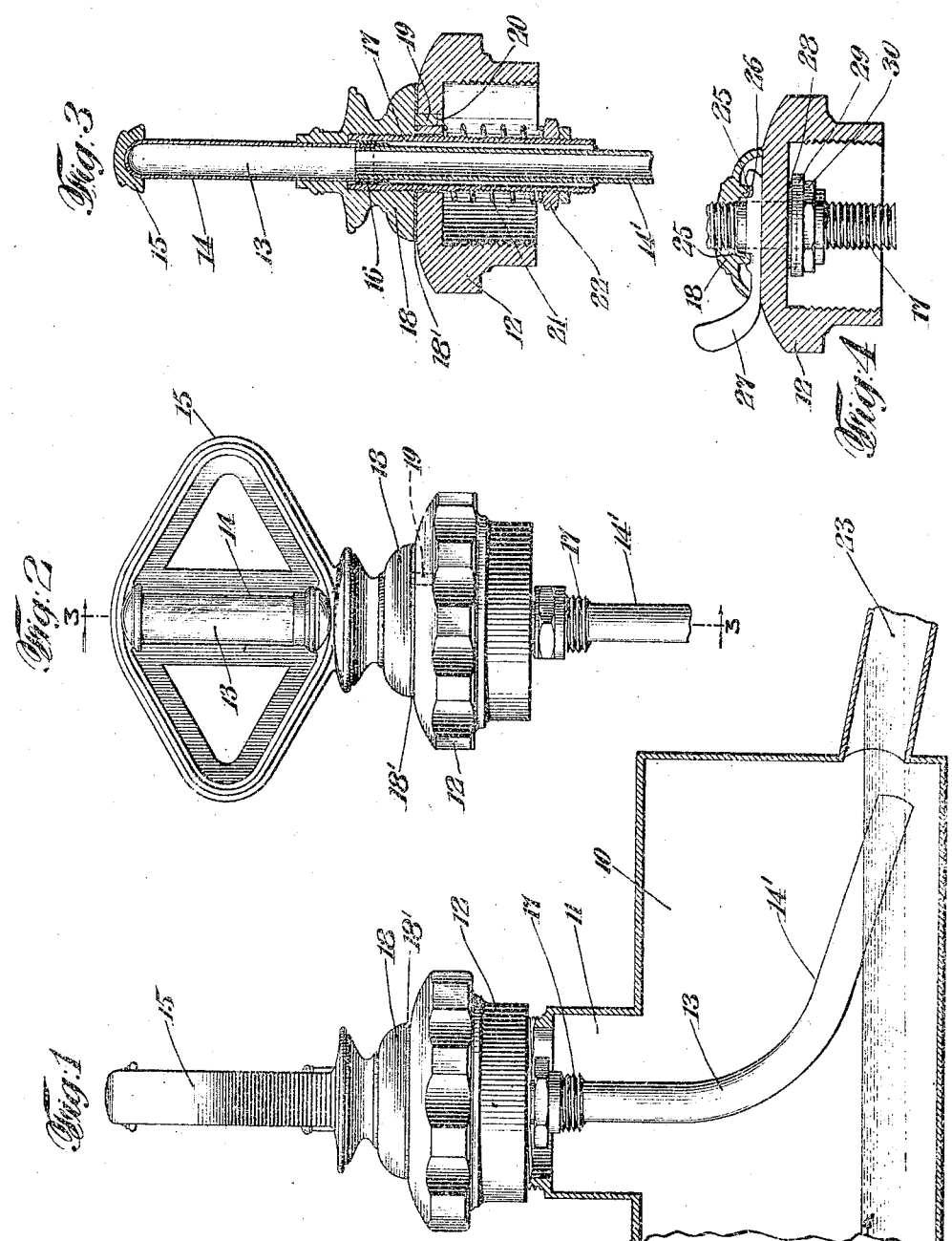

LOUIS V. ARONSON, OF NEWARK, NEW JERSEY.

TEMPERATURE-INDICATING DEVICE FOR COOLING SYSTEMS FOR INTERNAL-COMBUSTION ENGINES.

1,306,396.  Specification of Letters Patent.  Patented June 10, 1919.

Application filed October 17, 1916. Serial No. 126,197.

*To all whom it may concern:*

Be it known that I, LOUIS V. ARONSON, a citizen of the United States, and a resident of Newark, in the county of Essex and State of New Jersey, have invented certain new and useful Improvements in Temperature-Indicating Devices for Cooling Systems for Internal-Combustion Engines, of which the following is a specification.

The invention relates to temperature indicating means for the water cooling systems of internal combustion engines, especially as employed in connection with automobiles, and more particularly to means of this character in which the actual temperature condition of the cooling water is to be indicated. It will be appreciated that, generally, in order to reach the cooling water, the heat responsive element will be so located with respect to the tank space of the automobile radiator as to make it undesirable to disturb its position when removing the cap which closes the filling opening of the tank. The invention, therefore, has for its object to so mount the temperature indicating means, with heat responsive element extending to the cooling water, that the same may retain its position relatively to the tank while the said cap is unscrewed, whereupon the said device may be conveniently removed as a whole to allow of replenishing the water, and then again replaced without difficulty. A further object of the invention consists in means for continuing the heat responsive element to the cooling water.

In the accompanying drawings, which illustrate the invention—

Figure 1 is a side elevation of the improved temperature indicating device, located in the upper portion of an automobile radiator, the latter being shown in section.

Fig. 2 is a front elevation of the temperature indicating device and radiator cap.

Fig. 3 is a vertical section therethrough taken on the line 3—3, Fig. 2.

Fig. 4 is a sectional view illustrating a modification.

Similar characters of reference designate corresponding parts throughout the several views.

Referring to the drawings, 10 designates the radiator, or rather the upper tank portion thereof, which is generally provided with a cylindrical filling opening 11 through which the water of the radiator may be replenished, said opening being normally closed by a suitable cap 12 arranged to be screwed thereon. The cap 12 is designed, furthermore, to carry a suitable temperature indicating device, which may be of the metallic, vapor, liquid or similar type, and is herein shown, by way of example, as consisting of a compound tube 13 consisting in part of glass and in part of metal, said tube being adapted to retain a suitable liquid which undergoes a change in color over a certain range of temperature, reverting to the original color when the original temperature is restored. No claim, however, is made to the compound tube feature in the present application, the same being claimed in a co-pending application, Serial No. 126196, filed by me even date herewith. The outer portion of tube 13 visible above the cap 12 consists of a glass tube 14 closed at the top and mounted in a suitable protecting frame 15. At its lower and open end, tube 14 abuts a flexible tube 14′ of metal or other suitable material; or, preferably, is screwed over the end of same, the junction being sealed as by means of a short piece of rubber tubing 16 surrounding said junction, and about which is located a short length of metal tubing or bushing 17, externally threaded. The lower end of tube 17 is closed by means of solder or cement so that a rigid and substantial joint is provided, the portion of tube 13 beyond the bushing 17 being of a sufficiently flexible character for the purpose hereinafter set forth. The upper end of bushing 17 is screwed into the frame 15 or rather an enlarged extension or base 18 thereof, whose lower face is designed to rest upon the top of cap 12 or upon an interposed washer 18′.

In order to allow of relative motion between said cap and the frame 15 with contained temperature responsive device, as in unscrewing the cap when desiring to replenish the water in the tank, the underface of said enlargement 18 is provided with a downwardly extending pin 19, which is adapted to engage in a suitable socket 20 provided therefor in the top of the cap 13. To secure the two members against rattle and dislodgment, a spring 21 is interposed between the underface of cap 12 and a nut or nuts 22 about the lower end of bushing 17. When it is desired to unscrew the cap 12, it is necessary merely to raise the enlargement 18 to disengage its pin 19 from said cap and rotate the latter, whereupon the entire temperature indicator with the cap may be removed from the tank 10 and free access had thereto through the filling opening 11. The extending portion of the heat responsive element may then be returned with the cap to its proper position in the tank, for example, as shown in Fig. 1, wherein the end of same is indicated as placed directly in the path of the heated water issuing from the return pipe 23; or when this is not possible, it may be located on the bottom of the tank so as to extend well below the normal water level and be submerged. The unscrewing of the cap, when effected as aforesaid, will, therefore, not disturb the position of said heat responsive element in the tank, nor cause injury to the same.

In Fig. 4, a modification is illustrated, the base 18 being provided with downwardly extending pins 25 adapted to engage cam grooves 26 of a lever 27 mounted between the said base and the top of radiator cap 12 about the bushing 17. To regulate the tension between the same, a rubber washer 28 incased in a metal washer 29 is mounted within said cap upon the bushing 17 bearing against the underface of the cap and held into position by suitable lock nuts 30. By correspondingly shifting the lever 27, the base 18 may be loosened from or tightened to the said radiator cap, as desired.

I claim:

1. The combination with the cooling system of an internal combustion engine, embodying a radiator and a cap therefor, and a heat responsive element having a portion located in the cooling medium for said system; of means outside the cap of said radiator having means to normally lock said outside means thereto, said means being yieldably movable with the heat responsive element in respect to the cap and permitting of the same being unlocked as a whole from said cap, whereupon the latter may be rotated relatively to the former.

2. The combination with the cooling system of an internal combustion engine, embodying a radiator and a cap therefor, and a heat responsive element having a portion located in the cooling medium for said system; of yielding means within the radiator cap to hold the heat responsive element to said cap; and means outside of the cap of said radiator to normally lock said element thereto, said outside means being movable with the heat responsive element in respect to the cap and permitting of the same being unlocked as a whole from said cap, whereupon the latter may be rotated relatively to the former.

3. The combination with the cooling system of an internal combustion engine, embodying a radiator, and a cap therefor provided with a socket, and a heat responsive element carried by said cap and having a portion located in the cooling medium for said system; of a pin movable with the heat responsive element outside of the cap and adapted to fit the said cap socket; and a spring within said cap, acting on said heat responsive element and cap to retain the pin in the said socket.

4. The combination with the cooling system of an internal combustion engine, embodying a radiator and a cap therefor provided with a socket, and a heat responsive element carried by said cap and comprising a tubular member and a threaded bushing about said member; of a pin movable with said heat responsive element, adapted to fit the socket of the said radiator cap; a spring mounted about said bushing and bearing against the underface of the cap; and a nut about said bushing to place the spring under the desired tension.

Signed at Newark in the county of Essex and State of New Jersey this 13th day of October, A. D. 1916.

LOUIS V. ARONSON.